July 4, 1961 D. F. HANNON Re. 25,005

IDENTIFICATION CARD

Original Filed Sept. 30, 1958

INVENTOR.
DONALD F. HANNON
BY
Watts, Edgerton, Pike & Fisher
ATTORNEYS

United States Patent Office

Re. 25,005
Reissued July 4, 1961

25,005
IDENTIFICATION CARD

Donald F. Hannon, Shaker Heights, Ohio, assignor to Laminators Inc., a corporation of Ohio Original No. 2,932,913, dated Apr. 19, 1960, Ser. No. 764,386, Sept. 30, 1958. Application for reissue Jan. 12, 1961, Ser. No. 62,819
5 Claims. (Cl. 40—2.2)

Matter enclosed in heavy brackets [ ] appears in the original patent but forms no part of this reissue specification; matter printed in italics indicates the additions made by reissue.

This invention pertains to identification cards and more particularly to a laminated identification card.

In the past many proposals have been propounded for preparing laminated identification cards. Such cards are used for many and diverse purposes including identifying personnel who are entitled to be admitted to areas which are restricted for the security of the United States. It is essential that a card used for such purposes be resistant to tampering by persons who would seek to alter the card.

As one example of a tampering technique which has been used to provide falsified identification, dishonest persons have sometimes been able to remove an identifying photograph from a prior known identification card and substitute a false identifying photograph. This has been accomplished by very artfully cutting the protective coating around the periphery of the photograph, removing the photograph, separating the photograph from the protective covering and then substituting a photograph of some person other than the person the card is intended to identify. It is possible to replace the protective covering and seal it in position with heat or other means. This sealing has been accomplished in such a fashion that all evidence of tampering is obliterated to the extent that normal visual observation cannot detect it.

Accordingly, one of the principal objects of this invention is to provide a novel and improved identification card having a grid disposed over the message bearing portions of the identification card and formed integrally into the protective coating in such a fashion that it is impossible to alter the identification card without causing irrepairable damage to the grid work, which damage will be readily discernible by the visual observer.

Another object of the invention is to provide a novel and improved laminated identification card, which card has a fully transparent covering over the identifying media with the exception of the aforementioned grid work and which card at the same time has longer life, greater flexibility, and greater tear resistance than prior known cards.

Figure 1:
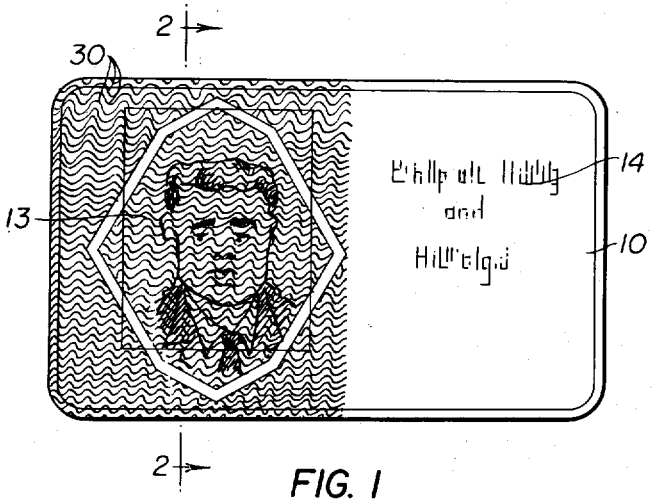
Figure 2:
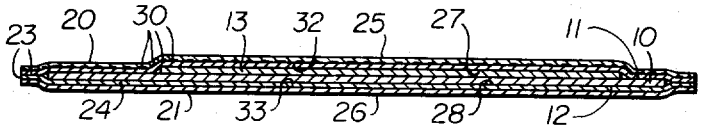

Other objects and a fuller understanding of the invention may be had by referring to the following specification and claims, taken in conjunction with the accompanying drawing, in which:

FIGURE 1 is a plan view of one of the faces of the novel and improved identification card; and, FIGURE 2 is a sectional view of the card as seen from the plane indicated by the line 2—2 of FIGURE 1 showing the laminated structure of the novel and improved identification card with the laminates disclosed in greatly exaggerated thickness dimension for clarity of disclosure.

Referring to the drawings, FIGURE 1 shows a top plan view of one of the identification cards. The identification card has a central portion 10 which is preferably paper. The center portion 10 has first and second surfaces 11, 12, both of which may be message bearing surfaces. Often identifying information is printed on both of the faces 11, 12. It will be apparent, however, that in many instances identification will only be shown on one face of the central portion 10 and, accordingly, for clarity of illustration this specification is directed to such a card.

The central portion 10 preferably has an identifying photograph 13 mounted on one face. The photograph will disclose a pictorial representation of the person being identified, while printed information describing the person may be included in the area generally indicated by the numeral 14. The written information in the area 14 is normally printed or typed on the central portion.

First and second outer reinforcement sheets 20, 21 are provided, FIGURE 2. The outer protective sheets 20, 21 are flexible, transparent, and tear-resistant. The preferred material for these outer protective sheets are sheets of polyester film. The polyester film is a polyethylene glycol ester of terephthalic acid. Expressed another way, the polyester film is polymerized polyethylene glycol ester. This material is sold commercially by the Du Pont de Nemours Company under the trademark "Mylar." This material is outstanding for this purpose because of its transparency, stability, tremendous tear resistance, high strength, long life, and high degree of imperviousness.

First and second bonding laminates 23, 24 are provided, FIGURE 2. The bonding laminates 23, 24 fix the protective sheets 20, 21 to the central portion 10 and tie the sheets together in an imperforate encompassing envelope. This encompassing envelope provides an exterior shell which is extremely smooth when supplied in sheet form and, because it is in thermo plastic within operative temperatures, cannot be directly sealed or resealed to a core, particularly to the paper central portion or core. Mylar is the presently known material which is acceptable and fulfills all these needs.

The bonding laminates are formed of a material which has the characteristics of being; thermoplastic, transparent, stable, capable of being heated without noticeable degradation, (i.e. inert), and capable of forming a bond. The laminates should also be capable of being formed into thin sheets of uniform thickness dimension. Polyethylene is an inexpensive chemical which is exceptional for this purpose, because it has all of the above outlined characteristics.

In the preferred and disclosed embodiment of the device, the polyethylene is bonded to the central portion 10.

It will be seen that the sheets 20, 21 and the laminates 23, 24 together form an impervious protective covering which has outer exposed surfaces 25, 26 and inner bonding surfaces 27, 28 which are fixed to the central portion 10. This covering has an interlocking grid work 30 formed in the body thereof and between the surfaces 25, 27 to cover at least the photograph. The grid may also be formed between the surfaces 26, 28. Normally placing the grid work over the photograph, or other object fixed to the center portion 10, is ample to prevent tampering. In the preferred and disclosed arrangement this grid work is obtained by printing the grid onto inner surface 32 of the sheet 20. The grid 30 may include a diamond shaped open part 31 which may simply take the form of an imprinted part. This diamond shaped opening aids in detection of tampering. It may, if desired, be printed onto inner surface 33 of the sheet 21 as well. After the grid is printed, the laminates 23, 24 are bonded to the surfaces 32, 33 respectively. Through this preferred technique a grid is provided in the body of the protective covering, which grid does not appreciably effect the legibility of the card, but which at the same time substantially eliminates any illicit modification of the card.

The grid work provides one of the outstanding advantages of the invention because card tampering is always detectable. A cut-out portion of the protective envelope cannot be returned to its proper place in an undetectable fashion because it is impossible to remove a portion and return it without causing irreplaceable damage to the grid work. This outstanding feature of the invention is furthered by the fact that the chemical bond between the sheets and the laminates is inseparable. In a properly bonded covering, it is impossible to separate one of the laminates from a bonded sheet without destroying either the laminate or the sheet.

In FIGURE 2 the center portion 10, the photograph 13, the sheets 20, 21, the laminates 23, 24, and the grid work 30 are all shown with greatly exaggerated thickness dimentions. This exaggeration is provided for clarity of illustration; in practice the card will be made as thin as possible and may, for example, be in the neighborhood of 1/64 of an inch in thickness.

The card has an overlapping portion 35 which is peripherally disposed about and circumscribes the central portion 10. These overlapping portions are overlapping in the sense that they extend out and beyond the central portion 10 in both longitudinal directions and in both transverse directions as well. The overlapping portion 35 prevents a separation of the sheets and laminates and thereby prevents card tampering by longitudinally slicing the protective laminate. It also strengthens the central portion 10 and gives the card a longer life by preventing longitudinal separation of this central portion.

While the invention has been described with a great deal of clarity and detail, it is believed that it essentially comprises a novel and improved identification card which has a grid work formed in the body of a protective covering. It also preferably comprises a laminated card which has an outer protective envelope permanently bonded to an inner portion by an intermediate laminate.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. An identification card comprising, a paper core sheet, identification indicia carried on the surface of [said] *the* core sheet, said indicia being protected against tampering alteration by a protective laminated envelope presenting an exterior surface shell formed of polyethylene glycol ester of terephthalic acid, said laminated envelope incorporating a [thermoplastic] *polyethylene* bond material *which is thermoplastic, stable, inert, and capable of forming a bond* bonding said exterior shell to [said] *the* paper core, said bond material located between said surface shell and *said* core sheet.

2. An identification card comprising a paper core sheet, identification indicia carried on the surface of said core sheet, said indicia being protected against tampering alteration by a protective laminated envelope presenting an exterior surface shell formed of polyethylene glycol ester of terephthalic acid, said laminated envelope incorporating a thermoplastic bond material bonding said exterior shell to said paper core, said bond material located between said surface shell and core sheet, and a grid pattern encased within the laminated envelope at the bonded interface between the exterior shell and the thermoplastic bond material.

3. An identification card comprising a paper core sheet, identification media including a photograph carried on the surface of said core sheet, said indicia being protected against tampering alteration by a protective laminated envelope presenting an exterior surface shell formed of polyethylene glycol ester of terephthalic acid, said laminated envelope incorporating a thermoplastic bond material bonding said exterior shell to said paper core, said bond material located between said surface shell and core sheet, and a grid pattern encased within the laminated envelope at the bonded interface between the exterior shell and the thermoplastic bond material, said grid pattern extending over said photograph and at least a portion of the identification indicia, other than the said photograph.

4. An identification card comprising a paper core sheet, identification media including a photograph carried on the surface of said core sheet, said indicia being protected against tampering alteration by a protective laminated envelope presenting an exterior surface shell formed of polyethylene glycol ester of terephthalic acid, said laminated envelope incorporating a polyethylene bond material bonding said exterior shell to said paper core, said bond material located between said surface shell and core sheet, and a grid pattern encased within the laminated envelope at the bonded interface between the exterior shell and the polyethylene bond material, said grid pattern extending over said photograph and at least a portion of the identification indicia, other than the said photograph.

5. The device of claim 4 wherein said grid is printed on an inner surface of said laminated envelope.

References Cited in the file of this patent or the original patent

UNITED STATES PATENTS

| | | |
|---|---|---|
| 2,545,804 | Butler | Mar. 20, 1951 |
| 2,780,015 | Whitehead | Feb. 5, 1957 |
| 2,835,993 | Whitehead | May 27, 1958 |